United States Patent
Liu et al.

(10) Patent No.: US 9,565,519 B2
(45) Date of Patent: Feb. 7, 2017

(54) FRAMEWORK AND METHOD FOR TRACKING LOST OR STOLEN ELECTRONIC DEVICE

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Yu-Ching Liu, New Taipei (TW); Fu-Chi Yang, New Taipei (TW); Shun-Tung Chen, New Taipei (TW); Wei-Da Yang, New Taipei (TW); Po-Lin Su, New Taipei (TW); Jin-Yong Huang, Shenzhen (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/686,197

(22) Filed: Apr. 14, 2015

(65) Prior Publication Data

US 2016/0105763 A1   Apr. 14, 2016

(30) Foreign Application Priority Data

Oct. 14, 2014   (CN) .......................... 2014 1 0539329

(51) Int. Cl.
*H04B 7/00*   (2006.01)
*H04B 1/38*   (2015.01)
(Continued)

(52) U.S. Cl.
CPC .............. *H04W 4/02* (2013.01); *H04W 64/00* (2013.01); *G01S 19/14* (2013.01); *H04L 63/0861* (2013.01); *H04W 12/06* (2013.01); *H04W 12/12* (2013.01)

(58) Field of Classification Search
CPC ........ H04W 8/22; H04W 4/028; H04W 24/08; H04W 12/12
(Continued)

(56) References Cited

U.S. PATENT DOCUMENTS 8,509,212 B2 *   8/2013   Sanjeev ................ H04W 4/028
                                                         340/539.13
8,750,828 B2 *   6/2014   Bennett .................. H04L 63/30
                                                             455/41.2

(Continued)

*Primary Examiner* — William D Cumming
(74) *Attorney, Agent, or Firm* — Zhigang Ma

(57) ABSTRACT

A framework for tracking an electronic device includes at least one electronic device, a server in wireless communication with the at least one electronic device, and a tracking system implemented in the server and the at least one electronic device. The server stores personal identification information of the at least one electronic device, and a database. The tracking system is used to track the at least one electronic device after the at least one electronic device is lost or stolen. The server controls the at least one electronic device to obtain tracking information for tracking the at least one electronic device, and the at least one electronic device sends the tracking information to the server. The server tracks the at least one electronic device by searching for information in the database most closely matching the tracking information.

13 Claims, 4 Drawing Sheets

(51) Int. Cl.
| | | |
|---|---|---|
| *H04M 1/66* | (2006.01) | |
| *H04M 1/68* | (2006.01) | |
| *H04M 3/16* | (2006.01) | |
| *H04M 11/04* | (2006.01) | |
| *H04M 1/00* | (2006.01) | |
| *H04W 24/00* | (2009.01) | |
| *H04W 4/02* | (2009.01) | |
| *H04W 64/00* | (2009.01) | |
| *H04W 12/06* | (2009.01) | |
| *G01S 19/14* | (2010.01) | |
| *H04L 29/06* | (2006.01) | |
| *H04W 12/12* | (2009.01) | |

(58) Field of Classification Search
USPC .......... 455/41.2, 404.2, 411, 456.2, 574, 410
See application file for complete search history.

(56) References Cited

U.S. PATENT DOCUMENTS

| | | | | |
|---|---|---|---|---|
| 9,055,475 | B2* | 6/2015 | Lacatus | H04W 24/08 |
| 2010/0265131 | A1* | 10/2010 | Fabius | G01S 19/16 |
| | | | | 342/357.54 |
| 2010/0273452 | A1* | 10/2010 | Rajann | H04W 8/22 |
| | | | | 455/411 |
| 2011/0070898 | A1* | 3/2011 | Sanjeev | H04W 4/028 |
| | | | | 455/456.2 |
| 2012/0270521 | A1* | 10/2012 | Lopez Garcia | H04L 63/107 |
| | | | | 455/411 |
| 2014/0274225 | A1* | 9/2014 | Lacatus | H04W 24/08 |
| | | | | 455/574 |
| 2014/0330685 | A1* | 11/2014 | Nazzari | G06Q 10/087 |
| | | | | 705/28 |
| 2014/0372743 | A1* | 12/2014 | Rogers | H04L 9/3234 |
| | | | | 713/2 |
| 2014/0373184 | A1* | 12/2014 | Mahaffey | H04W 12/12 |
| | | | | 726/35 |
| 2015/0213708 | A1* | 7/2015 | Barzangi | H04W 4/028 |
| | | | | 455/404.2 |
| 2015/0264647 | A1* | 9/2015 | Lacatus | H04W 24/08 |
| | | | | 455/574 |
| 2015/0325077 | A1* | 11/2015 | Lyons | G07F 17/323 |
| | | | | 463/40 |
| 2015/0356393 | A1* | 12/2015 | Daoura | G06Q 10/00 |
| | | | | 340/8.1 |
| 2015/0356858 | A1* | 12/2015 | Daoura | G06Q 10/00 |
| | | | | 340/539.32 |
| 2015/0356861 | A1* | 12/2015 | Daoura | G08B 21/0277 |
| | | | | 340/539.13 |
| 2015/0356862 | A1* | 12/2015 | Daoura | G08B 25/10 |
| | | | | 340/686.6 |
| 2015/0359127 | A1* | 12/2015 | Daoura | H02J 7/025 |
| | | | | 320/101 |
| 2016/0105763 | A1* | 4/2016 | Liu | H04W 4/02 |
| | | | | 455/411 |

* cited by examiner

FRAMEWORK AND METHOD FOR TRACKING LOST OR STOLEN ELECTRONIC DEVICE

FIELD

The subject matter herein generally relates to tracking technologies, and more particularly to a framework and method for tracking an electronic device that has been lost or stolen.

BACKGROUND

It is common for an electronic device, particularly a handheld electronic device such as a mobile phone or a tablet computer, to be lost or stolen. Tracking and thereby retrieving the lost or stolen electronic device becomes an issue.

BRIEF DESCRIPTION OF THE DRAWINGS

Implementations of the present technology will now be described, by way of example only, with reference to the attached figures.

DETAILED DESCRIPTION

Figure 1:
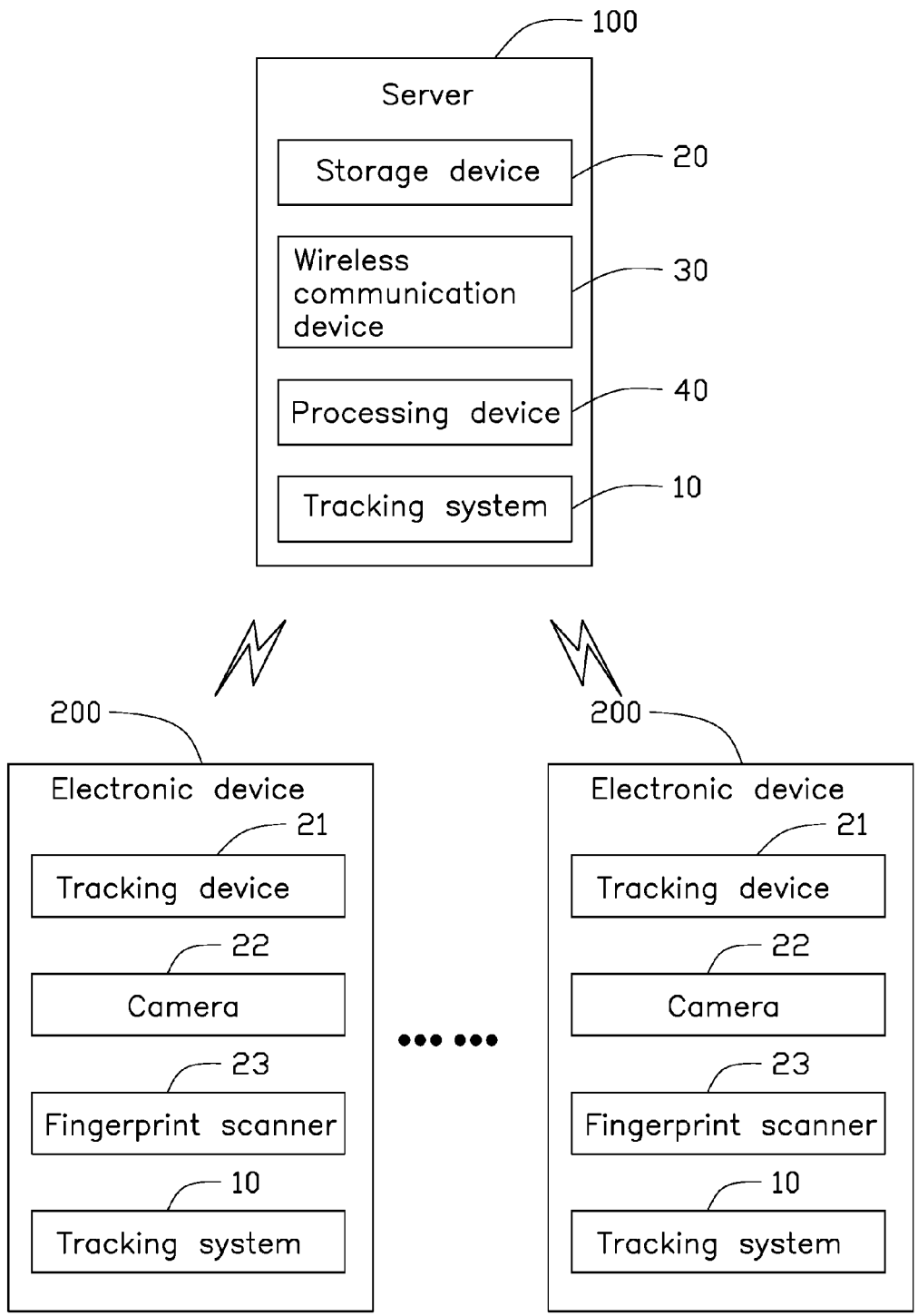
FIG. 1 is a block diagram of an embodiment of a framework for tracking an electronic device that has been lost or stolen, the framework including a tracking system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 illustrates an embodiment of a framework for tracking an electronic device 200 after the electronic device 200 has been lost or stolen. The framework can include a server 100 and a plurality of electronic devices 200. The server 100 can wirelessly communicate with the plurality of electronic devices 200. A tracking system 10 can be implemented in the server 100 and in each of the electronic devices 200. In addition to the tracking system 10, the server 100 can further include a storage device 20, a wireless communication device 30, and a processing device 40. The storage device 20 can store personal identification information and a corresponding identification code of each of the electronic devices 200. In at least one embodiment, the electronic device 200 is a mobile phone, and the personal identification information is an International Mobile Equipment Identity code of the electronic device 200. The identification code can be chosen by an owner of the electronic device 200. The identification code can be the owner's name, national identification number, or the serial number of a subscriber identification module (SIM) card of the electronic device 200. In this embodiment, the identification code is the serial number of the SIM card. The storage device 20 can also store a database, which includes information such as names, residence addresses, communication information, facial characteristics, or fingerprints of people of a country or territory. In this embodiment, the server 100 is mounted in a public security bureau or a police station. The wireless communication device 30 can establish wireless communication with a wireless communication device (not shown) of each of the electronic devices 200.

Each electronic device 200 can include a tracking device 21, a camera 22, and a fingerprint scanner 23. The tracking system 10 of each electronic device 200 can control the tracking device 21 to capture tracking information of the electronic device 200, when the electronic device 200 is lost or stolen, and control the electronic device 200 to send the tracking information to the server 100. In at least one embodiment, the tracking information includes an image of a face of an unauthorized user of the electronic device 200, and a fingerprint of the unauthorized user. The image of the face of the unauthorized user and the fingerprint of the unauthorized user can be captured by the camera 22 and the fingerprint scanner 23 of the electronic device 200, respectively. In other embodiment, the tracking information can include a location of the electronic device 200. The location of the electronic device 200 can be captured by a global positioning system of the electronic device 200.

Figure 2:
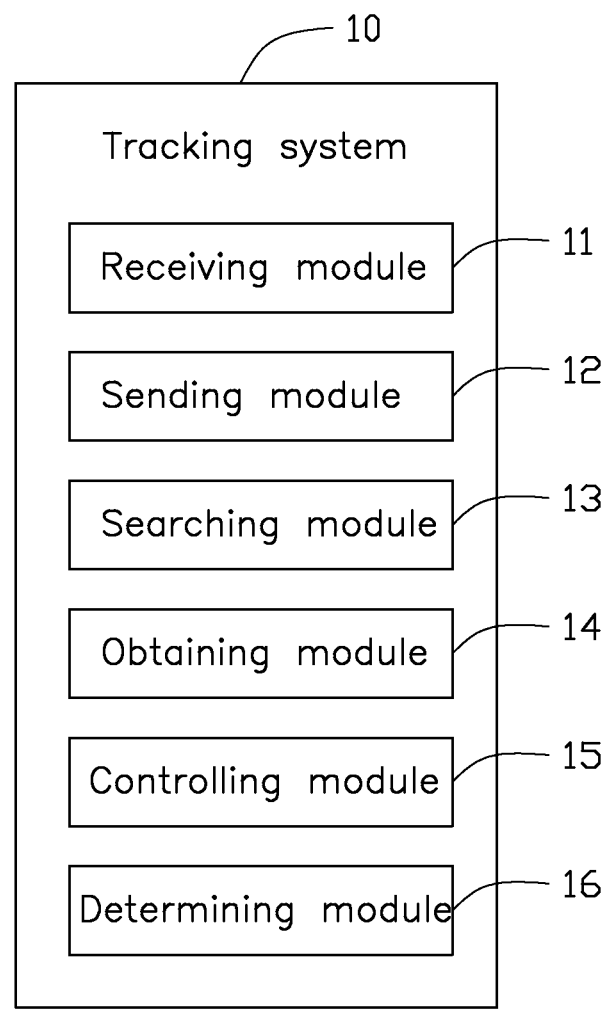
FIG. 2 is a block diagram of an embodiment of function modules of the tracking system of FIG. 1.

FIG. 2 illustrates an embodiment of a plurality of function modules of the tracking system 10. The tracking system 10 can include a receiving module 11, a sending module 12, a searching module 13, an obtaining module 14, a controlling module 15, and a determining module 16. The modules 11-16 can include one or more software programs in the form of computerized codes stored in the storage device 20 of the server 100. The computerized codes can include instructions executed by the processing device 40 of the server 100 to provide functions for the modules 11-16.

The receiving module 11 implemented in the server 100 can receive the personal identification information and the corresponding identification code sent by the plurality of electronic devices 200. The personal identification information and the corresponding identification code are stored in the storage device 20 of the server 100. The personal identification information and the corresponding identification code can be sent by the sending module 12 implemented in each electronic device 200.

When one of the electronic devices 200 is lost or stolen, the owner of the electronic device 200 can input a tracking request to the server 100. In detail, the owner of the electronic device 200 can input the corresponding identification code of the electronic device 200 to the server 100, and the obtaining module 14 implemented in the server 100 can obtain the personal identification information of the electronic device 200 from the storage device 20 according to the corresponding identification code. In other embodiments, the owner of the electronic device 200 can input the personal identification information of the electronic device 200 directly to the server 100. After the obtaining module 14 obtains the personal identification information of the electronic device 200, the obtaining module 14 can generate a tracking command to be sent to the electronic device 200 that has been lost or stolen. The sending module 12 implemented in the server 100 can send the tracking command to the electronic device 200. The receiving module 11 implemented in the electronic device 200 can receive the tracking command. After receiving the tracking command, the controlling module 15 can control the tracking device 21 to turn on to capture the tracking information of the electronic device 200. When the tracking information is the image of the unauthorized user's face or the fingerprint, the controlling module 15 controls the tracking device 21 to turn on the camera 22 or the fingerprint scanner 23, respectively, to capture the tracking information covertly once the unauthorized user accidently puts the face in front of the camera 22 or places the finger on the fingerprint scanner 23. When the tracking information is the location of the electronic device 200, the controlling module 15 controls the tracking device 21 to turn on the global positioning system of the electronic device 200.

After capturing the tracking information, the obtaining module 14 implemented in the electronic device 200 can obtain the tracking information from the tracking device 21. The sending module 12 implemented in the electronic device 200 can send the tracking information to the server 100, and the receiving module 11 implemented in the server 100 can receive the tracking information. The searching module 13 implemented in the server 100 can search the database according to the tracking information, and search for information of the database that most closely matches the tracking information. For example, when the tracking information is the fingerprint of the unauthorized user, then the searching module 13 searches for a fingerprint in the database that most closely matches the fingerprint of the tracking information. When the tracking information is the picture of the face of the unauthorized user, then the searching module 13 searches for a picture in the database that most closely matches the picture of the tracking information. Thus, the owner of the electronic device 200 can track the electronic device 200 by identifying the unauthorized user that most closely matches the tracking information.

The determining module 16 can determine whether the tracking information has been completely sent to the server 100. When the tracking information has been completely sent to the server 100, the controlling module 15 can control the electronic device 200 to delete the tracking information from the electronic device 200.

The first time that the tracking system 10 is run in the electronic device 200, the obtaining module 14 implemented in the electronic device 200 can also obtain the personal identification information and the corresponding identification code.

Figure 3:
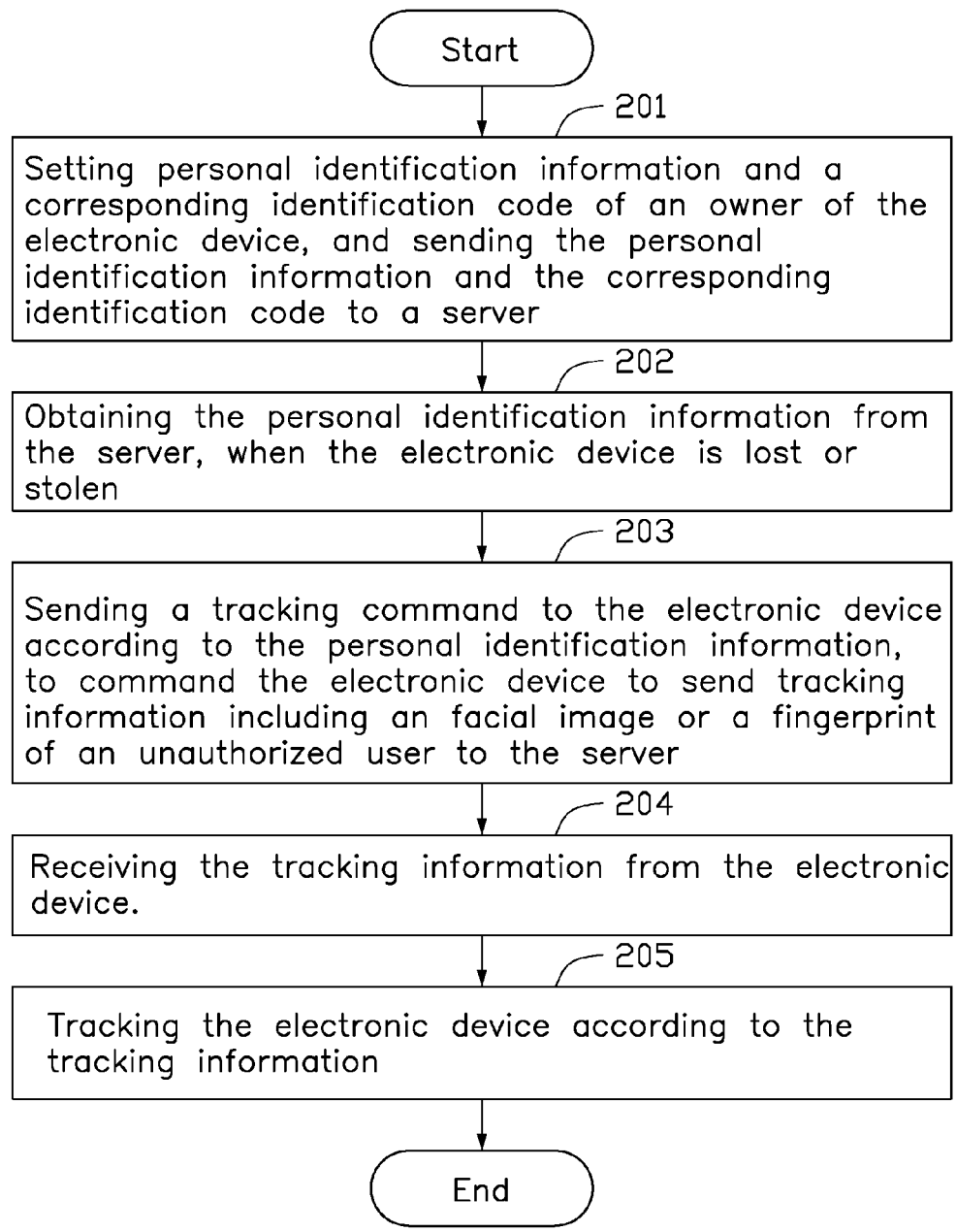
FIG. 3 is a flowchart of a method for tracking an electronic device that has been lost or stolen, the method being executed by a server of the framework.

FIG. 3 illustrates a flowchart of an exemplary method for tracking an electronic device that has been lost or stolen. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 201.

At block 201, an owner of the electronic device can set personal identification information and a corresponding identification code of the electronic device. The personal identification information and the corresponding identification code can be sent to a server. In at least one embodiment, the personal identification information is an International Mobile Equipment Identity code of the electronic device, and the identification code is chosen by the owner. In at least one embodiment, the identification code is a serial number of a SIM card of the electronic device.

At block 202, the personal identification information can be obtained from the server, when the electronic device is lost or stolen. In detail, the owner of the electronic device can input a tracking request to the server by inputting the corresponding identification code of the electronic device to the server. The server can obtain the personal identification information of the electronic device according to the corresponding identification code. In other embodiments, the owner of the electronic device can input the personal identification information of the electronic device directly to the server to input the tracking request.

At block 203, a tracking command can be sent from the server to the electronic device according to the personal identification information, to command the electronic device to capture tracking information of the electronic device. The tracking information includes an image of a face of an unauthorized user of the electronic device, and a fingerprint of the unauthorized user. After receiving the tracking command, the electronic device can be automatically turned on to capture the tracking information of the electronic device. In at least one embodiment, the tracking information includes an image of a face of an unauthorized user of the electronic device, and a fingerprint of the unauthorized user of the electronic device.

At block 204, the tracking information can be sent to the server from the electronic device.

At block 205, the electronic device can be tracked according to the tracking information. In detail, the server searches for information in a database that most closely matches the tracking information. For example, when the tracking information is the image of the face of the unauthorized user, then the server searches for an image in the database that most closely matches the image of the face of the unauthorized user. When the tracking information is the fingerprint of the unauthorized user, then the server searches for a fingerprint in the database that most closely matches the fingerprint of the unauthorized user.

Figure 4:
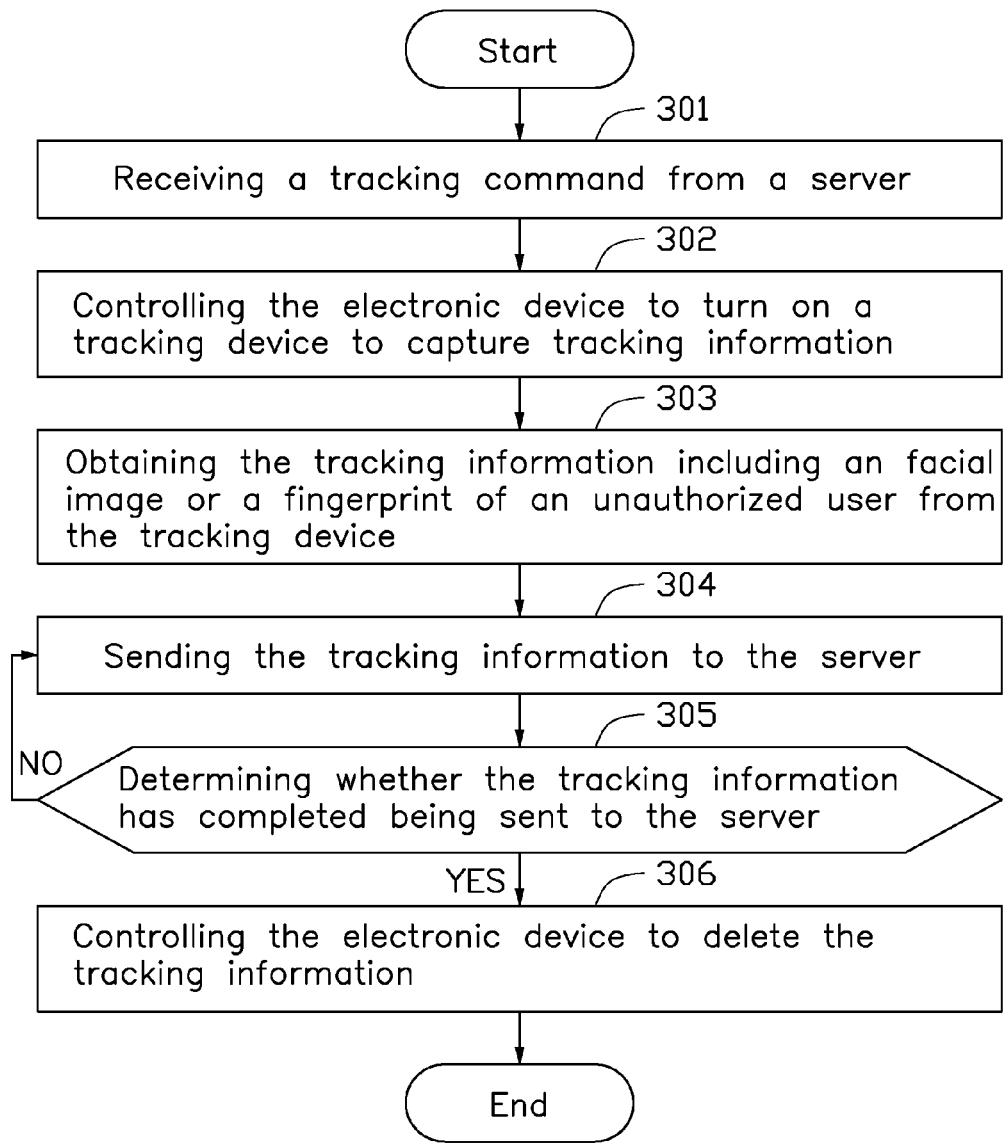
FIG. 4 is a flowchart of a method for tracking the electronic device, the method being executed by the electronic device of the framework.

FIG. 4 illustrates a flowchart of an exemplary method for the electronic device to capture and send tracking information after being lost or stolen. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks may be added or fewer blocks may be utilized, without departing from this disclosure. The example method can begin at block 301.

At block 301, the electronic device can receive a tracking command from a server.

At block 302, the tracking command can control the electronic device to turn on a tracking device to capture tracking information. The tracking information can include an image of a face of an unauthorized user of the device, and a fingerprint of the unauthorized user of the electronic device.

At block 303, the electronic device can obtain the tracking information from the tracking device.

At block 304, the electronic device can send the tracking information to the server.

At block 305, the electronic device can determine whether the tracking information has completed being sent to the server. When the tracking information has been completed being sent to the server, block 306 is implemented. When the tracking information has not yet completed being sent to the server, block 304 is implemented.

At block 306, the electronic device can be controlled to delete the tracking information.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A method for tracking an electronic device, the method comprising:
saving preset personal identification information and a corresponding identification code of the electronic device to a storage device of a server;
receiving an identification code of the electronic device when the electronic device is lost or stolen;
obtaining the personal identification information from the storage device of the server and generating a tracking command according to the personal identification information;
sending the tracking command to the electronic device to command the electronic device to capture tracking information of an unauthorized user covertly and send the tracking information to the server;
storing the tracking information in the electronic device, determining whether the tracking information has completed being sent to the server, and controlling the electronic device to delete the tracking information after the tracking information has completed being sent to the server;
receiving the tracking information from the electronic device at the server; and
tracking the electronic device according to the tracking information;
wherein the electronic device is tracked after the electronic device is lost or stolen; and
wherein the server and the electronic device communicate with each other wirelessly.

2. The method as in claim 1, wherein the tracking command is sent to the electronic device by the server in response to a tracking request input to the server.

3. The method as in claim 2, wherein:
the tracking request is input to the server by obtaining the personal identification information; and
the personal identification information is obtained by inputting the identification code to the server.

4. The method as in claim 2, wherein the tracking request is input to the server by inputting the personal identification information to the server.

5. The method as in claim 1, wherein the tracking information comprises at least one of a facial image and a fingerprint of the unauthorized user of the electronic device.

6. The method as in claim 5, wherein the electronic device uses a camera and a fingerprint scanner to obtain the facial image and the fingerprint, respectively.

7. The method as in claim 1, wherein the tracking information comprises a location of the electronic device obtained by a global positioning system of the electronic device.

8. A framework for tracking an electronic device, the framework comprising:
at least one electronic device;
a server in wireless communication with the at least one electronic device, the server comprising:
a storage device configured to store personal identification information and a corresponding identification code of the at least one electronic device, and store a database;
a processing device; and
a wireless communication device configured to wirelessly communicate with the at least one electronic device; and
a tracking system implemented in the server and the at least one electronic device;
wherein the tracking system is used to track the at least one electronic device after the at least one electronic device is lost or stolen;
wherein the server controls the at least one electronic device to obtain tracking information for tracking the at least one electronic device, and the at least one electronic device sends the tracking information to the server;
wherein the server tracks the at least one electronic device by searching for information in the database most closely matching the tracking information; and
wherein the tracking system comprises one or more programs which are executed by the processing device to:
save preset personal identification information and a corresponding identification code of the electronic device to a storage device of a server;
receive an identification code of the electronic device when the electronic device is lost or stolen;
obtain a corresponding personal identification information from the storage device, and generate a tracking command according to the personal identification information;

send the tracking command to the electronic device to command the electronic device to capture the tracking information of an unauthorized user covertly and send the tracking information to the server;

store the tracking information in the electronic device, determine whether the tracking information has completed being sent to the server, and control the electronic device to delete the tracking information after the tracking information has completed being sent to the server;

receive the tracking information from the electronic device at the server; and track the electronic device according to the tracking information.

9. The framework as in claim 8, wherein the tracking system is also executed by the processing device to obtain the personal identification information and the corresponding identification code, the first time the tracking system is run in the at least one electronic device.

10. The framework as in claim 8, wherein the tracking system is also executed by the processing device to obtain the personal identification information according to the identification code being input to the server.

11. The framework as in claim 8, wherein the tracking system is also executed by the processing device to obtain the personal identification information by the personal identification information being input to the server.

12. The framework as in claim 8, wherein the at least one electronic device comprises at least one tracking device configured to capture the tracking information.

13. The framework as in claim 8, wherein the information in the database comprises names, residence addresses, communication information, facial characteristics, and fingerprints of people of a country or territory.

* * * * *